United States Patent
Kim et al.

(10) Patent No.: US 10,414,363 B2
(45) Date of Patent: Sep. 17, 2019

(54) OIL SUPPLY SYSTEM OF VEHICLE AND CONTROL METHOD THEREOF

(71) Applicant: HYUNDAI MOTOR COMPANY, Seoul (KR)

(72) Inventors: Young Chul Kim, Gwangmyeong-si (KR); June Ho Lee, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 394 days.

(21) Appl. No.: 15/363,727

(22) Filed: Nov. 29, 2016

(65) Prior Publication Data

US 2017/0313273 A1 Nov. 2, 2017

(30) Foreign Application Priority Data

Apr. 28, 2016 (KR) .................. 10-2016-0052217

(51) Int. Cl.
*B60R 17/02* (2006.01)
*F16H 57/04* (2010.01)
(Continued)

(52) U.S. Cl.
CPC .............. *B60R 17/02* (2013.01); *B60K 11/02* (2013.01); *F01M 1/12* (2013.01); *F16H 57/0436* (2013.01); *F16H 57/0473* (2013.01); *F16N 7/385* (2013.01); *F16N 13/00* (2013.01); *F16N 25/00* (2013.01); *B60Y 2200/92* (2013.01); *B60Y 2306/03* (2013.01); *B60Y 2306/05* (2013.01);
(Continued)

(58) Field of Classification Search
CPC .......... B60R 17/02; B60K 11/02; F01M 1/12; F16H 57/0436; F16H 57/0473; F16N 7/385; F16N 13/00; F16N 25/00
See application file for complete search history.

(56) References Cited

U.S. PATENT DOCUMENTS

2006/0065217 A1* 3/2006 Ikegawa .................. F01M 1/02
123/41.42
2014/0179477 A1* 6/2014 Yamamoto .......... F16H 57/0025
475/1
(Continued)

FOREIGN PATENT DOCUMENTS

JP H07-158602 A 6/1995
JP 2008-069837 A 3/2008
(Continued)

*Primary Examiner* — William E Dondero
*Assistant Examiner* — Robert T Reese
(74) *Attorney, Agent, or Firm* — Brinks Gilson & Lione

(57) ABSTRACT

An oil supply system of a vehicle includes: a first pump generating a first quantity of oil to cool a driving motor of a hybrid vehicle; a second pump generating a second quantity of oil to lubricate a friction lubrication element of the hybrid vehicle; a flow channel switching valve selectively switching a flow channel of the first quantity of oil and a flow channel of the second quantity of oil to connect the flow channel of the first quantity of oil to the friction lubrication element or connect the flow channel of the second quantity of oil to the driving motor; and a controller controlling an operation of the flow channel switching valve to supply a portion of the first quantity of oil to the friction lubrication element or a portion of the second quantity of oil to the driving motor.

18 Claims, 9 Drawing Sheets

(51) Int. Cl.
    *F16N 25/00*      (2006.01)
    *B60K 11/02*      (2006.01)
    *F16N 13/00*      (2006.01)
    *F16N 7/38*       (2006.01)
    *F01M 1/12*       (2006.01)
    *F01M 1/02*       (2006.01)

(52) U.S. Cl.
    CPC .............. *F01M 2001/0215* (2013.01); *F01M 2001/0253* (2013.01); *F01M 2001/123* (2013.01); *F16N 2210/04* (2013.01); *F16N 2210/18* (2013.01); *F16N 2270/70* (2013.01); *F16N 2280/02* (2013.01)

(56) References Cited

U.S. PATENT DOCUMENTS

| | | | |
|---|---|---|---|
| 2015/0367793 A1 | 12/2015 | Ishikawa et al. | |
| 2016/0230756 A1* | 8/2016 | Kito | ............. B60R 17/02 |
| 2017/0210315 A1* | 7/2017 | Nakajima | ............. B60K 6/24 |

FOREIGN PATENT DOCUMENTS

| | | |
|---|---|---|
| JP | 2009-115186 A | 5/2009 |
| JP | 2012-215246 A | 11/2012 |
| JP | 2014-124977 A | 7/2014 |
| KR | 10-2012-0060641 A | 6/2012 |
| KR | 10-2012-0063299 A | 6/2012 |
| KR | 10-2014-0048582 A | 4/2014 |
| KR | 10-2015-0113968 A | 10/2015 |

* cited by examiner

| MODE | | DRIVING OF OIL PUMP | | OPERATION OF SOLENOID | | SUPPLY/DISTRIBUTION OF QUANTITY OF OIL FOR LUBRICATION AND COOLING |
|---|---|---|---|---|---|---|
| | | FIRST PUMP (EOP) | SECOND PUMP (MOP) | FIRST SOLENOID PUMP | SECOND SOLENOID PUMP | |
| STOP | | ON | OFF | O | × | REAR ← MOTOR<br>(MOP) (EOP) |
| EV MODE | MOTOR TEMPERATURE IS NORMAL | OFF | ON | × | O | REAR ↑ MOTOR<br>(MOP) (EOP) |
| | MOTOR TEMPERATURE IS OVER TEMPERATURE | ON | ON | × | O | REAR ↑ MOTOR ↑<br>(MOP) (EOP) |
| HEV MODE | MIDDLE SPEED DRIVING | ON | ON | × | × | REAR ↑ MOTOR ↑<br>(MOP) (EOP) |
| | HIGH SPEED DRIVING | ON | ON | O | × | REAR ↑ MOTOR ↑<br>(MOP) (EOP) |
| ENGINE ONLY | | ON | ON | O | × | REAR ↑ MOTOR ↑<br>(MOP) (EOP) |

FIG.8

OIL SUPPLY SYSTEM OF VEHICLE AND CONTROL METHOD THEREOF

CROSS-REFERENCE TO RELATED APPLICATION

This application claims priority to and the benefit of Korean Patent Application No. 10-2016-0052217, filed on Apr. 28, 2016, which is incorporated herein by reference in its entirety.

FIELD

The present disclosure relates to an oil supply system of a vehicle and a control method thereof.

BACKGROUND

The statements in this section merely provide background information related to the present disclosure and may not constitute prior art.

In general, a hybrid vehicle includes both an electric motor and an internal combustion engine as a power source, and since both the internal combustion engine and the motor are used, large rotation torque may be used at low speeds, and when driven by the electric motor, the hybrid vehicle generates a small amount of noise and does not emit a harmful gas. Also, since the internal combustion engine is limitedly used when desired or in a region with high efficiency, the hybrid vehicle may be designed to have a low fuel consumption rate in spite of a compact size and also convert kinetic energy to electric energy under brake operation.

A vehicle may be driven by one gasoline engine and two motors, which are mechanically connected by a planetary gear device and a differential gear device for a driving wheel, and one of two motors is connected to the differential gear by a driving chain or a gear. This system is referred as to a hybrid system.

An oil pump system including a plurality of oil pumps is applied to a transmission of the hybrid vehicle to supply oil to lubricate friction lubrication elements (e.g., a bearing, a bush, a gear, and the like), to cool cooling elements (e.g., an electric motor, or the like), or to form control pressure of operational elements (e.g., a clutch, a brake, and the like).

Flow rate characteristics of oil consumed for each element are varied according to operational conditions of a vehicle, or the like. For example, a quantity of oil consumed for lubricating a friction lubrication element may be increased in proportion to a vehicle speed, a quantity of oil consumed for cooling a cooling element may be increased when torque of an electric motor is increased in a climbing/acceleration condition of a vehicle, and the like, and a quantity of oil consumed for forming control pressure of an operating element may be increased at the time of transmission.

In the related art, we have discovered that it is very difficult to control a flow rate of an oil pump according to operational conditions such as an operation mode, a motor temperature, and the like, and the efficiency of the control is degraded.

SUMMARY

The present disclosure addresses the above-mentioned problems occurring in the prior art while advantages achieved by the prior art are maintained intact.

An aspect of the present disclosure provides an oil supply system of a vehicle, having a structure improved to control a quantity of oil according to operation conditions such as an operation mode, a motor temperature, and the like, and a control method thereof.

According to an exemplary form of the present disclosure, an oil supply system of a vehicle includes: a first pump configured to generate a first quantity of oil to cool a driving motor of a hybrid vehicle; a second pump configured to generate a second quantity of oil to lubricate a friction lubrication element of the hybrid vehicle; a flow channel switching valve configured to selectively switch a flow channel of the first quantity of oil and a flow channel of the second quantity of oil to connect the flow channel of the first quantity of oil to the friction lubrication element or the flow channel of the second quantity of oil to the driving motor; and a controller configured to control an operation of the flow channel switching valve to supply a portion of the first quantity of oil to the friction lubrication element to assist the second quantity of oil or a portion of the second quantity of oil to the driving motor to assist the first quantity of oil according to a predetermined operation mode.

According to another form, a control method of an oil supply system of a vehicle includes: switching a flow channel of a first quantity of oil generated by a first pump to cool a driving motor of a hybrid vehicle and a flow channel of a second quantity of oil generated by a second pump to lubricate a friction lubrication element by using a flow channel switching valve; and supplying at least a portion of the second quantity of oil to the driving motor to assist the first quantity of oil or supplying at least a portion of the first quantity of oil to the friction lubrication element to assist the second quantity of oil.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 8 is a table illustrating a method for selectively controlling pumps and a flow channel switching valve according to an operation mode of a vehicle in the oil supply system of a vehicle illustrated in FIG. 1.

Figure 1:
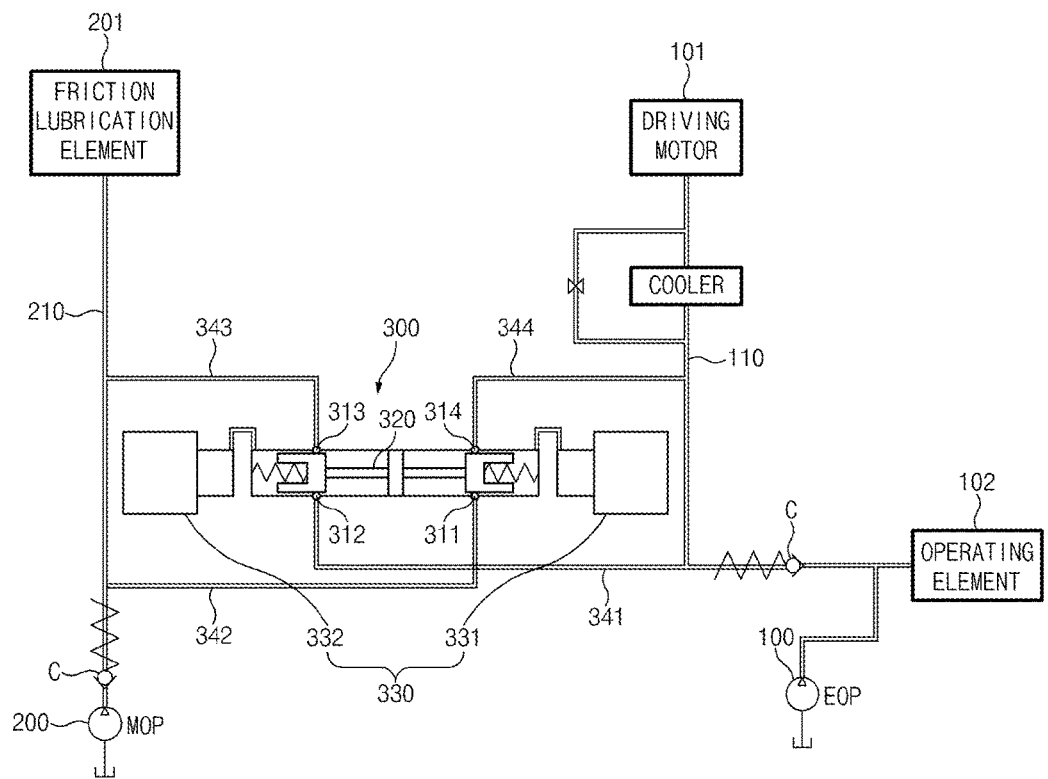
FIG. 1 is a structure diagram illustrating an oil supply system of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a structure diagram illustrating an oil supply system of a vehicle according to an exemplary form of the present disclosure.

Referring to FIG. 1, an oil supply system of a vehicle includes: a first pump 100 generating a first quantity of oil to cool a driving motor 101; a second pump 200 generating a second quantity of oil to lubricate a friction lubrication element 201; a flow channel switching valve 300 switching a flow channel of the first quantity of oil and a flow channel of the second quantity of oil; and a controller 400 controlling the flow channel switching valve 300 to supply a portion of the first quantity of oil to the friction lubrication element 201 to assist the second quantity of oil or supply a portion of the second quantity of oil to the driving motor 101 to assist the first quantity of oil according to a predetermined operation mode.

In the present disclosure, a flow channel of the first quantity of oil refers to a path along which the first quantity of oil is to pass so as to be supplied to the driving motor 101 or the friction lubrication element 201, and a flow channel of the second quantity of oil refers to a path along which the second quantity of oil is to pass so as to be supplied to the driving motor 101 or the friction lubrication element 201. The flow channel of the first quantity of oil and the second flow channel of the second quantity of oil includes main flow channels 110 and 210, bypass flow channels 341, 342, 343, and 344, the flow channel switching valve 300, and the like.

First, the first pump 100 is an oil pump generating the first quantity of oil to cool the driving motor 101.

In one form, the first pump 100 is an electrical oil pump (EOP) but not limited thereto. The first pump 100 is directly connected to the driving motor 101 by a first main flow channel 110 and supplies the first quantity of oil, as a cooling quantity of oil, to the driving motor 101 through the first main flow channel 110 to cool the driving motor 101. The first pump 100 is connected to the flow channel a switching valve 300 by the first bypass flow channel 341. The first pump 100 may be connected to operating elements including a clutch and a brake through a flow channel (not shown) to supply the first quantity of oil to an operating element 102.

The second pump 200 is an oil pump generating the second quantity of oil to lubricate the friction lubrication element 201.

In another form, the second pump is an MOP but is not limited thereto. The second pump is directly connected to the friction lubrication element 201 by the second main flow channel 210 and supplies the second quantity of oil, as a cooling quantity of oil, to the friction lubrication element 201 through the second main flow channel 210 to lubricate the friction lubrication element 201. Here, the friction lubrication element 201 is a component which relatively moves with respect to a peripheral component such as a bearing, a bush, a gear, and the like, to be worn or generate heat. When a vehicle runs at a certain speed, the second pump 200 may operate to perform appropriate lubrication on the friction lubrication element 201 through the second quantity of oil. The second pump 200 may be connected to a flow channel switching valve 300 by the second bypass flow channel 342.

Figure 2:
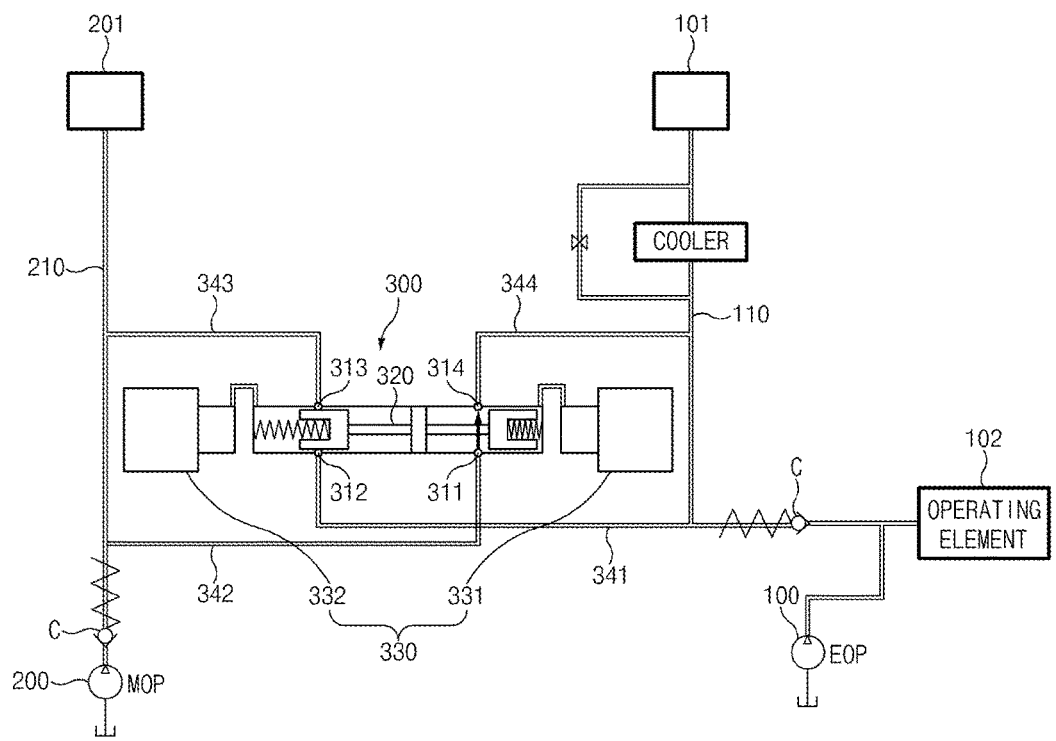
FIG. 2 is a structure diagram illustrating a state of supplying oil when a first solenoid valve operates in the oil supply system of a vehicle illustrated in FIG. 1.
Figure 3:
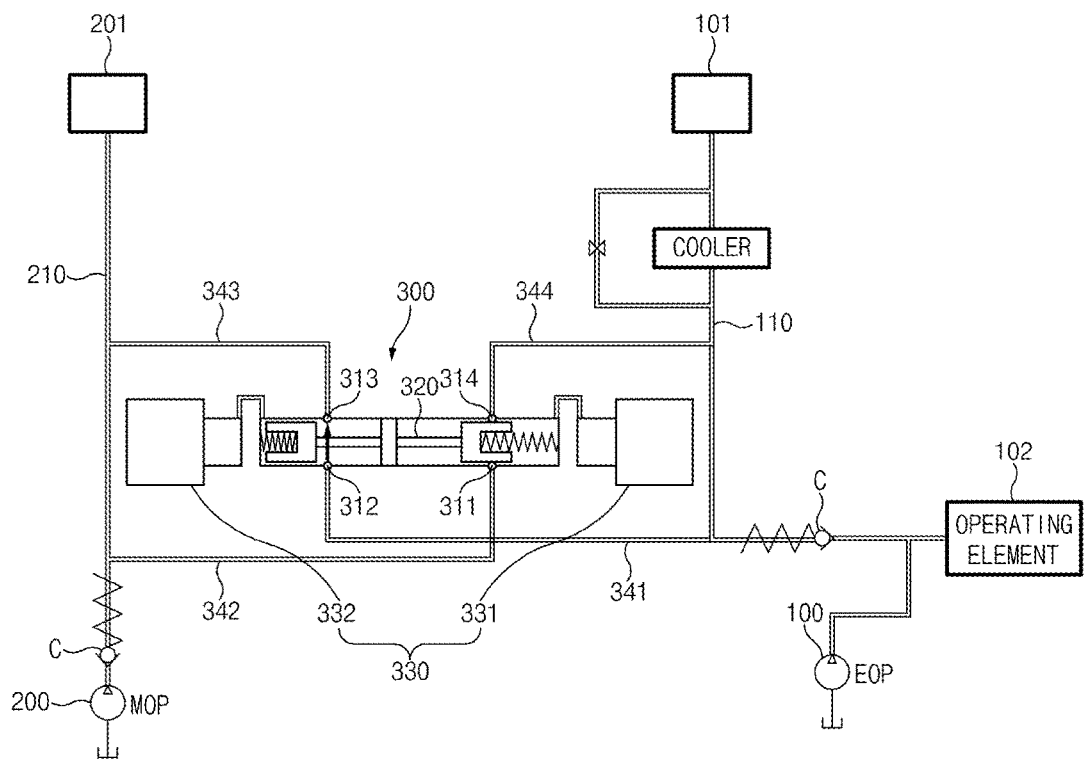
FIG. 3 is a structure diagram illustrating a state of supplying oil when a second solenoid valve operates in the oil supply system of a vehicle illustrated in FIG. 1.

FIG. 2 is a structure diagram illustrating a state of supplying oil when a first solenoid valve operates in the oil supply system of a vehicle illustrated in FIG. 1, and FIG. 3 is a structure diagram illustrating a state of supplying oil when a second solenoid valve operates in the oil supply system of a vehicle illustrated in FIG. 1.

The flow channel switching valve 300 is provided between the first main flow channel 110 and the second main flow channel 210 to selectively switch a flow channel of the first quantity of oil and a flow channel of the second quantity of oil such that the first pump 100 is connected to the friction lubrication element 201 or the second pump 200 is connected to the driving motor 101. The flow channel switching valve 300 is connected to the first main flow channel 110 and the second main flow channel 210 by a plurality of bypass flow channels 341, 342, 343, and 344.

The first bypass flow channel 341 may connect the first main flow channel 110 and a second port 312 of the flow channel switching valve 300 to supply the first quantity of oil to the flow channel switching valve 300. The third bypass flow channel 343 may connect a third port 313 of the flow channel switching valve 300 and the second main flow channel 210 to allow the first quantity of oil which has sequentially passed through the first bypass flow channel 341 and the flow channel switching valve 300 to be supplied to the second main flow channel 210.

The second bypass flow channel 342 may connect the second main flow channel 210 and a first port 311 of the flow channel switching valve 300 to supply the second quantity of oil to the flow channel switching valve 300. The fourth bypass flow channel 344 may connect a fourth port 314 of the flow channel switching valve 300 and the first main flow channel 110 to supply the second quantity of oil from the second bypass flow channel 342 to the first main flow channel 110.

Although it is described that the bypass flow channels 341, 342, 343, and 344 are connected to the main flow channels 110 and 210, but the present disclosure is not limited thereto. For example, the first bypass flow channel 341 may be connected to the first pump 100, the second bypass flow channel 342 may be connected to the second pump 200, the third bypass flow channel 343 may be connected to the friction lubrication element 201, and the fourth bypass flow channel 344 may be connected to the driving motor 101.

A check ball "C" may be provided in the first main flow channel 101 between the first pump 100 and the driving motor 101 to inhibit or prevent backflow of the first quantity of oil. Also, a check ball "C" may be provided in the second main flow channel 210 between the second motor and the friction lubrication element 201 to inhibit or prevent backflow of the second quantity of oil.

The flow channel switching valve 300 includes the first to fourth ports 311, 312, 313, and 314, a spool 320, and a solenoid valve 330.

The first to fourth ports 311, 312, 313, and 314 are connected to the first to fourth bypass flow channels 341, 341, 343, and 344, respectively, and allow the first quantity of oil supplied from the first pump 100 and the second quantity of oil supplied form the second pump 200 to flow to the flow channel switching valve 300 or to be discharged from the flow channel switching valve 300. The first to fourth ports 311, 312, 313, and 314 may transfer the first quantity of oil which has passed through the first bypass flow channel 341 to the third bypass flow channel 343 or may transfer the second quantity of oil which has passed through the second bypass flow channel 342 to the fourth bypass flow channel 344 according to a disposition of the spool 320.

The spool 320, serving to selectively open or close each of the first to fourth ports 311, 312, 313, and 314, is movably provided within the flow channel switching valve 300. The spool 320, moved by a solenoid valve 330, opens or closes each of the first to fourth ports 3121, 312, 313, and 314 to selectively switch a flow channel of the first quantity of oil and a flow channel of the second quantity of oil.

The spool 320 is provided with elastic force from an elastic member provided between one end of the spool 320 and one inner wall of the flow channel switching valve 300 and an elastic member provided between the other end of the spool 320 and the other inner wall of the flow channel switching valve 300 such that both ends thereof are supported by the aforementioned elastic members so as to be positioned in a middle portion (i.e., first position) of the flow channel switching valve 300.

The solenoid valve 330 is provided in the flow channel switching valve 300 to move the spool 320. An installation number of the solenoid valve 330 is not particularly limited. For example, as the solenoid valve 330, a pair of first solenoid valve 331 and second solenoid valve 332, or the like, may be provided.

The first solenoid valve 331 may be installed on one side of the flow channel switching valve 300 and provide magnetic force to the spool 320 to transfer the spool 320 toward the other end (i.e., a second position) of the flow channel switching valve 300. The second solenoid valve 332 may be installed on the other side of the flow channel switching valve 300 and provide magnetic force to the spool 320 to transfer the spool 320 toward one end (i.e., a third position) of the flow channel switching valve 300.

Hereinafter, a method for switching a flow channel of the first quantity of oil and a flow channel of the second quantity of oil using the flow channel switching valve 300 will be described with reference to FIGS. 1 to 3 and Table 1. Table 1 below shows various aspects in which the first to fourth ports 311, 312, 313, and 314 of the flow channel switching valve 300 are opened and closed according to a driving status of the solenoid valves.

TABLE 1

| | Solenoid valve | | Port | |
|---|---|---|---|---|
| Spool position | First solenoid | Second solenoid | First and fourth ports | Second and third ports |
| First position | X | X | Closed | Closed |
| Second position | ○ | X | Closed | Opened |
| Third position | X | ○ | Opened | Closed |

For example, as illustrated in FIG. 1, in a case in which both the first solenoid valve 331 and the second solenoid valve 332 are stopped, the spool 320 is positioned in the middle portion (i.e., the first position) of the flow channel switching valve 300 by elastic force from the elastic members. Then, the first to fourth ports 311, 312, 313, and 314 are closed by the spool 320, and the first and fourth bypass flow channels 341 and 344 and the second and third bypass flow channels 342 and 343 are disconnected, respectively. Accordingly, the flow channel of the first quantity of oil and the friction lubrication element 201 are disconnected, and the flow channel of the second quantity of oil and the driving motor 101 are disconnected.

Accordingly, the first quantity of oil may be supplied to the driving motor 101 through the first main flow channel 110, and the second quantity of oil may be supplied to the friction lubrication element 201 through the second main flow channel 110.

For example, as illustrated in FIG. 2, in a case in which the first solenoid valve 331 operates and the second solenoid valve 332 is stopped, the spool 320 is positioned (i.e., in the second position) to be adjacent to the other end of the flow channel switching valve 300 due to magnetic force provided from the first solenoid valve 331. Then, the first and fourth ports 311 and 314 are closed and the second and third ports 312 and 313 are opened Also, the first and third bypass flow channels 341 and 343 are connected by an internal flow channel of the flow channel switching valve 300 and the second and fourth bypass flow channels 342 and 344 are disconnected. Accordingly, the flow channel of the first quantity of oil and the friction lubrication element 201 are connected and the flow channel of the second quantity of oil and the driving motor 101 are disconnected.

Accordingly, a portion of the first quantity of oil may be supplied to the driving motor 101 through the first main flow channel 110, and the other portion of the first quantity of oil may be supplied to the friction lubrication element 201 through the second main flow channel 210 by way of the flow channel switching valve 300. Also, the second quantity of oil may be supplied to the friction lubrication element 201 through the second main flow channel 210. In particular, the first quantity of oil is divided to be supplied to both the driving motor 101 and the friction lubrication element 201 and the second quantity of oil is supplied only to the friction lubrication element 201.

For example, as illustrated in FIG. 3, in a case in which the first solenoid valve 331 is stopped and the second solenoid valve 332 operates, the spool 320 is positioned (i.e., in the third position) to be adjacent to one end of the flow channel switching valve 300 by magnetic force provided from the second solenoid valve 332. Then, the first and fourth ports 311 and 314 are opened and the second and third ports 312 and 313 are closed. Also, the first and third bypass flow channels 341 and 343 are disconnected and the second and fourth bypass flow channels 342 and 344 are connected by an internal flow channel of the flow channel switching valve 300. Accordingly, the flow channel of the first quantity of oil and the friction lubrication element 201 are disconnected and the flow channel of the second quantity of oil and the driving motor 101 are connected.

Accordingly, the first quantity of oil may be supplied to the driving motor 101 through the first main flow channel 110. Also, a portion of the second quantity of oil may be supplied to the friction lubrication element 201 through the second main flow channel 210, and the other portion thereof may be supplied to the driving motor 101 through the first main flow channel 210 by way of the flow channel switching valve 300. In particular, the first quantity of oil is supplied only to the driving motor 101 and the second quantity of oil is distributed to be supplied to both the driving motor 101 and the friction lubrication element 201.

When both the first solenoid valve 331 and the second solenoid valve 332 are stopped, the spool 320 may be restored to the aforementioned first position by elastic force provided from the elastic member, and thus, all the first to fourth ports 311, 312, 313, and 314 are closed.

Figure 4:
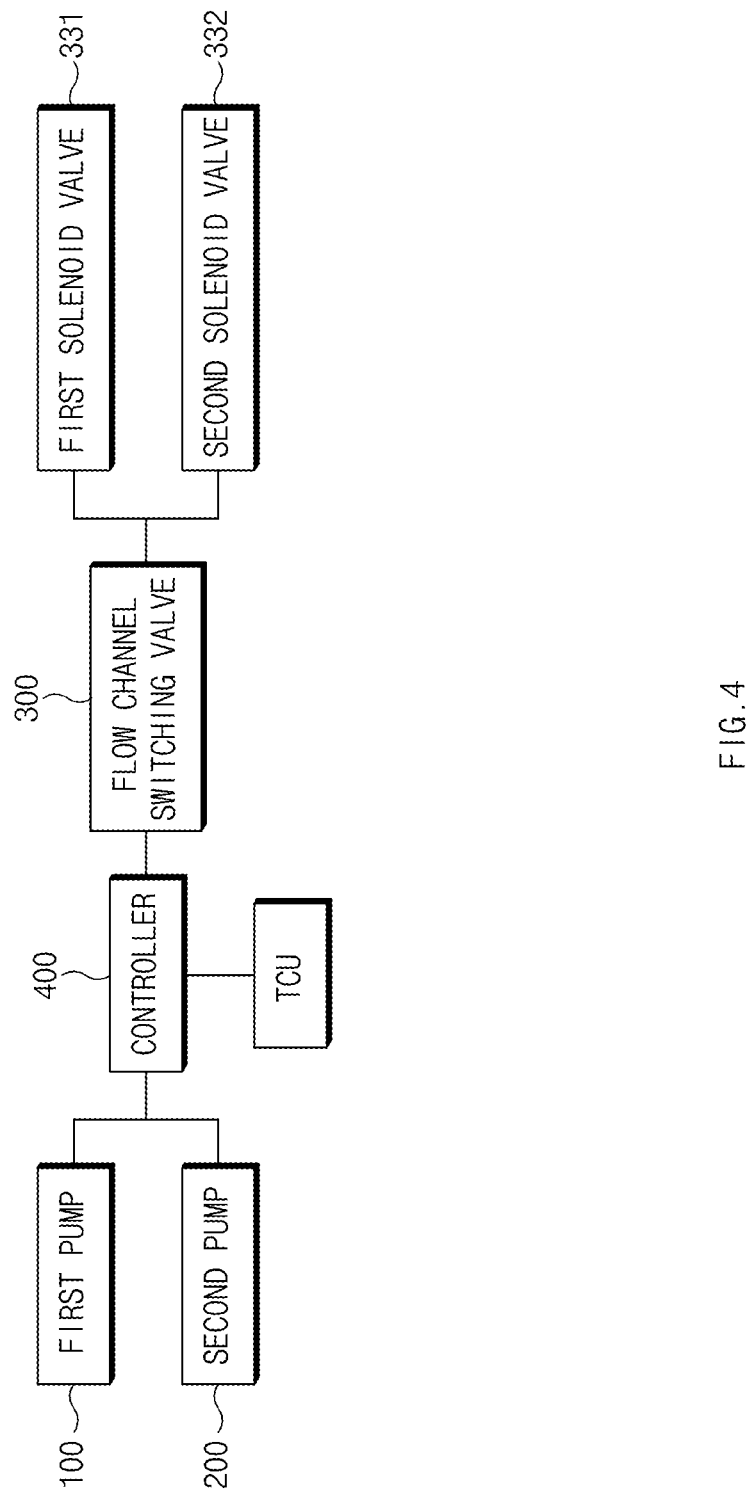
FIG. 4 is a block diagram illustrating a control system of the oil supply system of a vehicle illustrated in FIG. 1.
Figure 5:
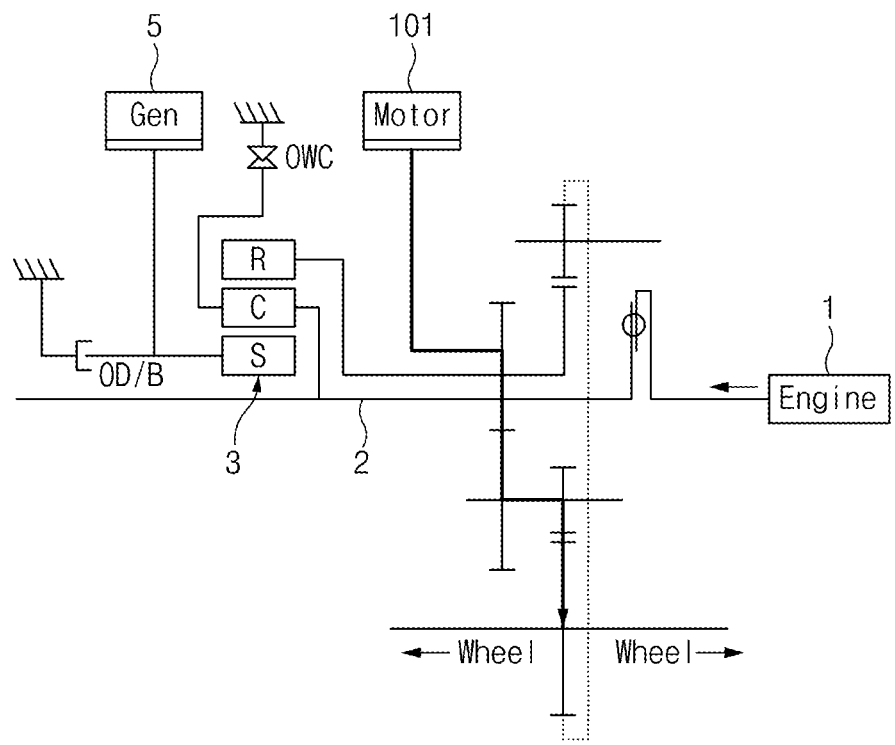
FIG. 5 is a structure diagram illustrating an electric vehicle (EV) mode state in a transmission structure of a hybrid vehicle to which the oil supply system of a vehicle illustrated in FIG. 1 is applied.
Figure 6:
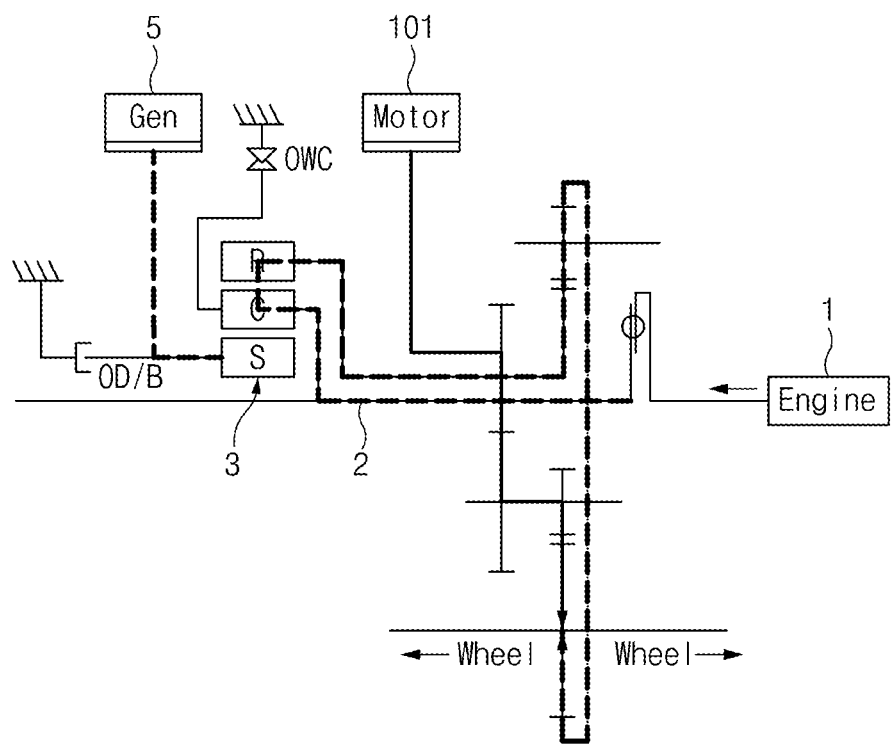
FIG. 6 is a structure diagram illustrating a power split mode of a hybrid electric vehicle (HEV) mode in a transmission structure of a hybrid vehicle to which the oil supply system of a vehicle illustrated in FIG. 1 is applied.

FIG. 4 is a block diagram illustrating a control system of the oil supply system of a vehicle illustrated in FIG. 1, FIG. 5 is a structure diagram illustrating an electric vehicle (EV) mode state in a transmission structure of a hybrid vehicle to which the oil supply system of a vehicle illustrated in FIG. 1 is applied, and FIG. 6 is a structure diagram illustrating a power split mode of a hybrid electric vehicle (HEV) mode in a transmission structure of a hybrid vehicle to which the oil supply system of a vehicle illustrated in FIG. 1 is applied.

Figure 7:
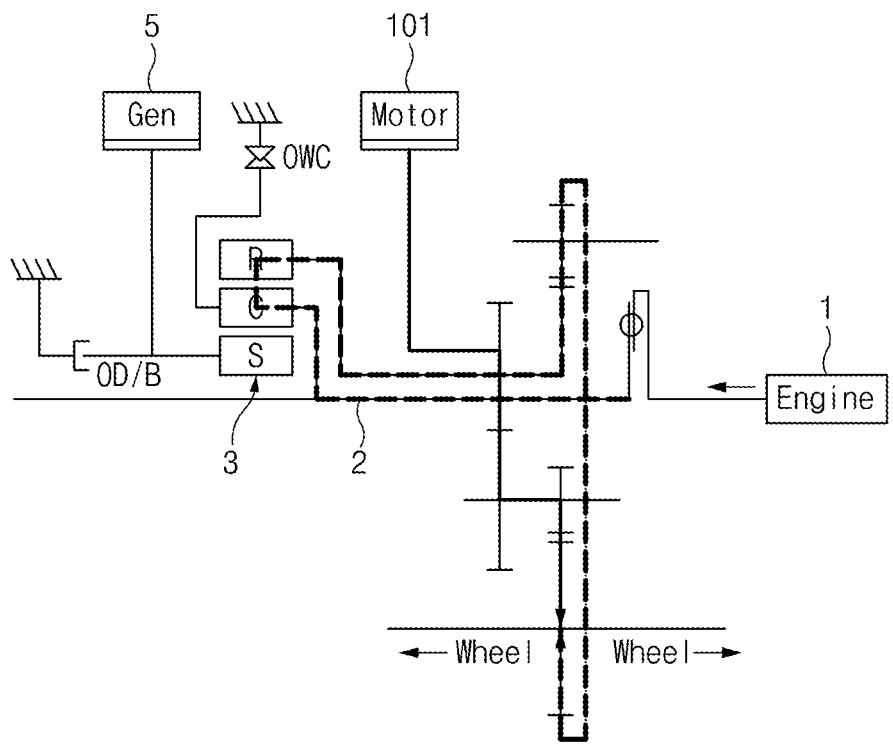
FIG. 7 is a structure diagram illustrating a parallel mode of an EV mode in a transmission structure of a hybrid vehicle to which the oil supply system of a vehicle illustrated in FIG. 1 is applied.

FIG. 7 is a structure diagram illustrating a parallel mode of an EV mode in a transmission structure of a hybrid vehicle to which the oil supply system of a vehicle illustrated in FIG. 1 is applied, and FIG. 8 is a table illustrating a method for selectively controlling pumps and a flow channel switching valve according to an operation mode of a vehicle in the oil supply system of a vehicle illustrated in FIG. 1.

As illustrated in FIG. 4, the controller 400 is electrically connected to the first pump 100, the second pump 200, and the flow channel switching valve 300 to control driving of the first pump 100, the second pump 200, and the flow channel switching valve 300.

In general, a hybrid vehicle is driven according to operation modes such as a stop mode, an EV mode, an HEV mode, an engine mode, and the like.

The stop mode refers to a mode in which movement of a vehicle is stopped.

The EV mode refers to a mode in which a vehicle is moved using only power from the driving motor 101, without using power from an engine, as illustrated in FIG. 5.

The HEV mode refers to a mode in which a vehicle is moved using both power from an engine and power from the driving motor 101 as illustrated in FIG. 6. In the HEV mode, in a state in which an engine 1, an input shaft 2, a planetary gear set 3, the driving motor 101, and a driving shaft are connected, a sun gear of the planetary gear set 3 is connected to a power generation motor 5 to allow the power generation motor 5 to control an engine rate and a portion of power from the engine 1 is transferred through a ring gear and a carrier of the planetary gear set 3 and the other portion is transferred from the driving motor 101 for driving.

The engine mode refers to a mode in which a vehicle is moved using only power from an engine as illustrated in FIG. 7. In the engine mode, the engine 1, the input shaft 2, the planetary gear set 3, the driving motor 101, and the driving shaft are connected, and power from the engine 1 and the driving motor 101 is transferred to the driving shaft.

In response to the operation modes, the controller 400 controls the pumps 100 and 200 and the flow channel switching valve 300 such that the first quantity of oil and the second quantity of oil are selectively distributed to the driving motor 101 and the friction lubrication element 201. To this end, the controller 400 may interwork with a transmission control unit (TCU) of a vehicle implementing the aforementioned operation modes.

Hereinafter, a method for controlling the pumps 100 and 200 and the flow channel switching valve 300 according to operation modes of a vehicle to distribute the first quantity of oil and the second quantity of oil to be selectively supplied to the driving motor 101 and the friction lubrication element 201 will be described with reference to the accompanying drawings.

First, as illustrated in FIG. 8, when a vehicle is driven in the stop mode, the controller operates the first pump 100, stops the second pump 200, and disposes the spool 320 in the second position. Then, a flow channel of the first quantity of oil is connected to the friction lubrication element 201, and thus, a portion of the first quantity of oil is supplied as a cooling quantity of oil to the driving motor, and the other portion of the first rate of oil is supplied as a lubrication quantity of oil to the friction lubrication element 201. This control scheme considers the fact that, when the vehicle is driven in the stop mode, a small cooling quantity of oil and a small lubrication quantity of oil are desired, and thus, even though only the first quantity of oil is distributed and supplied to each of the driving motor 101 and the friction lubrication element 201, a sufficient cooling quantity of oil and lubrication quantity of oil may be provided.

When the vehicle is driven in the EV mode, the controller selectively controls the pumps 100 and 200 and the flow channel switching valve 300 in response to a temperature of the driving motor 101.

For example, as illustrated in FIG. 8, when a temperature of the driving motor 101 is within a predetermined normal range, the controller operates the second pump 200, stops the first pump 100, and disposes the spool 320 in the third position. Then, the flow channel of the second quantity of oil and the driving motor 101 are connected, and a portion of the second quantity of oil is supplied as a lubrication quantity of oil to the friction lubrication element 201. And the other portion of the second quantity of oil is supplied as a cooling quantity of oil to the driving motor 101. This control scheme considers the fact that, when the temperature of the driving motor 101 is within a normal range, a small cooling quantity of oil and a small lubrication quantity of oil are desired, and thus, even though only the second quantity of oil is distributed to be supplied to each of the driving motor 101 and the friction lubrication element 201, a sufficient cooling quantity of oil and lubrication quantity of oil may be provided.

For example, as illustrated in FIG. 8, when the temperature of the driving motor 101 is beyond a predetermined normal temperature range, the controller operates the first pump 100 and the second pump 200 and disposes the spool 320 in the third position. Then, the first quantity of oil is supplied as a cooling quantity of oil to the driving motor 101. Also, the flow channel of the second quantity of oil and the driving motor 101 are connected, and thus, a portion of the second quantity of oil is supplied as a lubrication quantity of oil to the friction lubrication element 201 and the other portion of the second quantity of oil is supplied as a cooling quantity of oil to the driving motor 101. As such, a portion of the second quantity of oil is supplied as a cooling quantity of oil to the driving motor 101 to assist the first quantity of oil. This control scheme considers the fact that, when the temperature of the driving motor 101 exceeds the predetermined normal temperature range, only the first quantity of oil, as a cooling quantity of oil, is insufficient, and thus a relatively large cooling quantity of oil is desired, compared with the cooling quantity of oil when the temperature of the driving motor 101 is within a normal range.

When the vehicle is being driven in the HEV mode, among driving modes of the vehicle, the controller selectively controls the pumps 100 and 200 and the flow channel switching valve 300 in response to a vehicle speed.

For example, as illustrated in FIG. 8, when a vehicle speed is within a predetermined middle speed range, the controller operates both the first pump 100 and the second pump 200 and disposes the spool 320 in the first position. Then, the first quantity of oil is entirely supplied as a cooling quantity of oil to the driving motor 101. Also, the second quantity of oil is entirely supplied as a lubrication quantity of oil to the friction lubrication element 201. This control scheme considers the fact that, when the vehicle speed is within the middle speed range, the first quantity of oil is sufficient as a cooling quantity of oil and the second quantity of oil is sufficient as a lubrication quantity of oil.

For example, as illustrated in FIG. 8, when a vehicle speed is within a predetermined high speed range, the controller operates the first pump 100 and the second pump 200 and disposes the spool 320 in the second position. Then, the flow channel of the first quantity of oil is connected to the friction lubrication element 201, and thus, a portion of the first quantity of oil is supplied as a cooling quantity of oil to the driving motor 101 and the other portion of the first quantity of oil is supplied as a lubrication quantity of oil to the friction lubrication element 201. Also, the second quantity of oil is entirely supplied as a lubrication quantity of oil to the friction lubrication element 201. That is, a portion of the first quantity of oil is supplied as a lubrication quantity of oil to the friction lubrication element 201 to assist the second quantity of oil. This control scheme considers the fact that, when the vehicle speed is within the high speed range, only the second quantity of oil, as the lubrication quantity of oil, is insufficient, and rather a relatively large lubrication quantity of oil is desired, compared with the lubrication quantity of oil when the vehicle velocity is within a low speed range.

When the vehicle is driven in the engine mode, as illustrated in FIG. 8, the controller operates the first pump 100 and the second pump 200 and disposes the spool 320 in the second position. Then, the flow channel of the first quantity of oil and the friction lubrication element 201 are connected, and thus, a portion of the first quantity of oil is supplied as a cooling quantity of oil to the driving motor 101 and the other portion of the first quantity of oil is supplied as a lubrication quantity of oil to the friction lubrication element 201. Also, the second quantity of oil is entirely supplied as a lubrication quantity of oil to the friction lubrication element 201. That is, a portion of the first quantity of oil is supplied as a lubrication quantity of oil to the friction lubrication element 201 to assist the second quantity of oil. This control scheme considers the fact that, when the vehicle is driven in the engine mode, a relative large lubrication quantity of oil is desired, and thus, only the second quantity of oil, as the lubrication quantity of oil, is insufficient.

The oil supply system of a vehicle may effectively distribute the first quantity of oil generated in the first pump 100 and the second quantity of oil generated in the second pump 200 according to the operation modes, operational conditions such as a temperature of the driving motor 101, and the like, to supply the same to the driving motor 101 and the friction lubrication element 201 such that a cooling quantity of oil of the driving motor 101 and a lubrication quantity of oil of the friction lubrication element 201 are sufficient.

Figure 9:
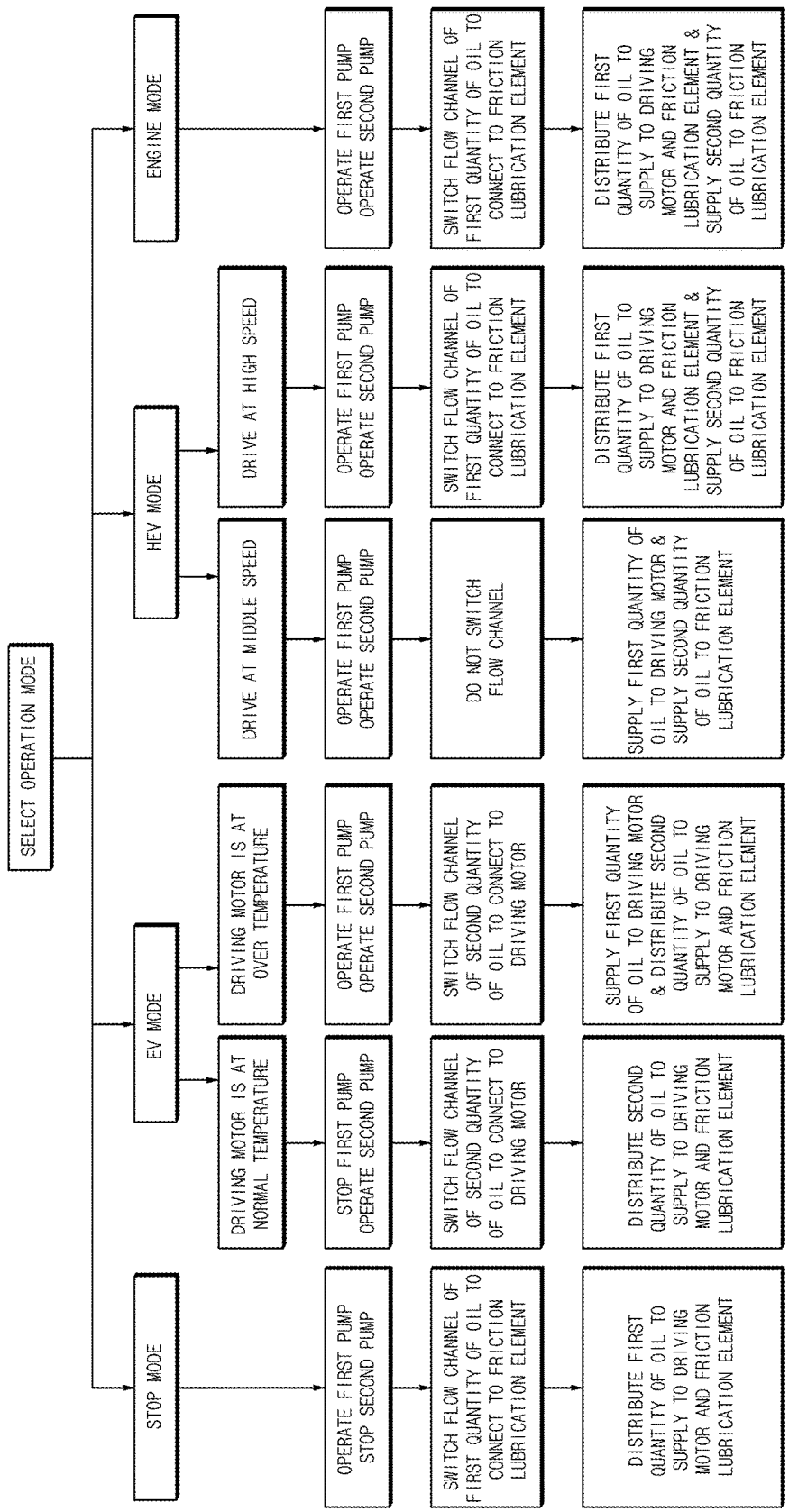
FIG. 9 is a flow chart illustrating an oil supply method of a vehicle.

FIG. 9 is a flow chart illustrating an oil supply method of a vehicle according to another exemplary form of the present disclosure.

The control method of an oil supply system of a vehicle is performed to selectively switch a flow channel of a first quantity of oil generated by the first pump 100 to cool the driving motor 101 and a flow channel of a second quantity of oil generated by the second pump 200 to lubricate the friction lubrication element 201, by using the flow channel switching valve 300, and supplies a portion of the second quantity of oil to the driving motor 101 to assist the first quantity of oil or supplies a portion of the first quantity of oil to the friction lubrication element 201 to assist the second quantity of oil. Content related to the aforementioned oil supply system of a vehicle is referred to FIGS. 1 to 8.

The control method of an oil supply system of a vehicle enables a portion of the first quantity of oil supplied form the first pump to be supplied to the friction lubrication element 201 through the flow channel switching valve 300 to assist the second quantity of oil or enables a portion of the second quantity of oil supplied from the second pump 200 to be supplied to the driving motor 101 through the flow channel switching valve 300 to assist the first quantity of oil according to preset operation modes.

For example, when the vehicle is driven in the stop mode, the first pump 100 may be operated, the second pump 200 may be stopped, and a portion of the first quantity of oil may be supplied to the driving motor 101 and the other portion of the first quantity of oil may be supplied to the friction lubrication element 201 by switching a flow channel of the first quantity of oil using the flow channel switching valve 300.

For example, when the vehicle is driven in the EV mode and a temperature of the driving motor 101 is within a predetermined normal temperature range, the first pump 100 may be stopped, the second pump 200 may be operated, and a portion of the second quantity of oil may be supplied to the friction lubrication element 201 and the other portion of the second quantity of oil may be supplied to the driving motor 101 by switching a flow channel of the second quantity of oil using the flow channel switching valve 300.

For example, in a case in which the vehicle is driven in the EV mode, when a temperature of the driving motor 101 is within a predetermined over temperature range, the first pump 100 and the second pump 200 may be operated, and the first quantity of oil may be supplied to the driving motor 101, a portion of the second quantity of oil may be supplied to the friction lubrication element 201 and the other portion of the second quantity of oil may be supplied to the driving motor 101 to assist the first quantity of oil by switching a flow channel of the second quantity of oil using the flow channel switching valve 300.

For example, when the vehicle is driven in the HEV mode and a vehicle velocity is within a predetermined middle speed range, the first pump 100 and the second pump 200 may be operated, and the first quantity of oil may be supplied to the driving motor 101 and the second quantity of oil may be supplied to the friction lubrication element 201.

For example, in a case in which the vehicle is driven in the HEV mode, when a vehicle velocity is within a predetermined high speed range, the first pump 100 and the second pump 200 may be operated, and a second quantity of oil may be supplied to the friction lubrication element 201, a portion of the first quantity of oil may be supplied to the driving motor 101, and the other portion of the first quantity of oil may be supplied to the friction lubrication element 201 to assist the second quantity of oil by switching a flow channel of the first quantity of oil using the flow channel switching valve 300.

For example, in a case in which the vehicle is driven in the engine mode, the first pump 100 and the second pump 200 may be operated, and the second quantity of oil may be supplied to the friction lubrication element 201, a portion of the first quantity of oil may be supplied to the driving motor 101, and the other portion of the first quantity of oil may be supplied to the friction lubrication element 201 to assist the second quantity of oil by switching a flow channel of the first quantity of oil using the flow channel switching valve 300.

As described above, according to the oil supply system of a vehicle and the control method thereof, the first quantity of oil generated in the first pump and the second quantity of oil generated in the second pump may be effectively distributed and supplied to the driving motor and the friction lubrication element according to the operation modes, operational conditions such as a temperature of the driving motor, and the like, such that a cooling quantity of oil of the driving motor and a lubrication quantity of oil of the friction lubrication element are sufficient.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An oil supply system of a hybrid vehicle, the oil supply system comprising:
    a first pump configured to generate a first quantity of oil to cool a driving motor of the hybrid vehicle;
    a second pump configured to generate a second quantity of oil to lubricate a friction lubrication element of the hybrid vehicle, wherein a first main flow channel supplying the first quantity of oil to the driving motor and a second main flow channel supplying the second quantity of oil to the friction lubrication element are independently of each other connected to the driving motor and the lubrication element;
    a flow channel switching valve configured to selectively supply a portion of the first quantity of oil to the friction lubrication element to assist the second quantity of oil via a first bypass flow channel branched out from the first main flow channel, or a portion of the second quantity of oil to the driving motor to assist the first quantity of oil via a second bypass flow channel branched out from the second main flow channel; and
    a controller configured to control an operation of the flow channel switching valve according to a predetermined operation mode of the hybrid vehicle,
    wherein the first bypass flow channel and the second bypass flow channel are separately connected to the flow channel switching valve.

2. The oil supply system according to claim 1, wherein the flow channel switching valve includes:
    a plurality of ports configured to allow the first quantity of oil supplied from the first pump and the second quantity of oil supplied from the second pump to be introduced to the flow channel switching valve or to be discharged from the flow channel switching valve; and
    a spool configured to selectively open or shut each of the plurality of ports to selectively switch the first main flow channel of the first quantity of oil and the second main flow channel of the second quantity of oil.

3. The oil supply system according to claim 2, wherein the flow channel switching valve further includes:
    a solenoid valve configured to move the spool to be disposed in any one of a first position, a second position, and a third position,
    wherein
    the first position is a position in which the first main flow channel of the first quantity of oil and the friction lubrication element are disconnected by the spool and the second main flow channel of the second quantity of oil and the driving motor are disconnected,
    the second position is a position in which the first main flow channel of the first quantity of oil and the friction lubrication element are connected by the spool and the second main flow channel of the second quantity of oil and the driving motor are disconnected, and
    the third position is a position in which the first main flow channel of the first quantity of oil and the friction lubrication element are disconnected by the spool and the second main flow channel of the second quantity of oil and the driving motor are connected.

4. The oil supply system according to claim 3, wherein the solenoid valve includes a first solenoid valve configured to transfer the spool to the second position, and a second solenoid valve configured to transfer the spool to the third position.

5. The oil supply system according to claim 4, wherein the flow channel switching valve further includes:
    at least one elastic member installed between the spool and an inner surface of the flow channel switching valve and configured to provide elastic force to transfer the spool to the first position.

6. The oil supply system according to claim 4, wherein the first pump, the second pump, the first solenoid valve, and the second solenoid valve are operated or stopped, separately, according to respective operation modes of the hybrid vehicle, and
    wherein the operation modes of the hybrid vehicle include a stop mode, an electric vehicle (EV) mode, a hybrid electric vehicle (HEV) mode, and an engine mode.

7. The oil supply system according to claim 6, wherein when the hybrid vehicle is driven in the stop mode, the controller is configured to operate the first pump, stop the second pump, and dispose the spool in the second position.

8. The oil supply system according to claim 6, wherein when the hybrid vehicle is driven in the EV mode and a temperature of the driving motor is within a predetermined normal range, the controller is configured to operate the second pump, stop the first pump, and dispose the spool in the third position.

9. The oil supply system according to claim 6, wherein when the hybrid vehicle is driven in the EV mode and a temperature of the driving motor exceeds a predetermined normal temperature range, the controller is configured to operate the first pump and the second pump and dispose the spool in the third position.

10. The oil supply system according to claim 6, wherein when the hybrid vehicle is driven in the HEV mode and a vehicle velocity is within a predetermined middle speed range, the controller is configured to operate the first pump and the second pump and dispose the spool in the first position.

11. The oil supply system according to claim 6, wherein when the hybrid vehicle is driven in the HEV mode and a vehicle velocity is within a predetermined high speed range, the controller is configured to operate the first pump and the second pump and dispose the spool in the second position.

12. The oil supply system according to claim 6, wherein when the hybrid vehicle is driven in the engine mode, the controller is configured to operate the first pump and the second pump and dispose the spool in the second position.

13. The oil supply system according to claim 1, further comprising:
    a check ball provided in the flow channel of the first quantity of oil and the flow channel of the second quantity of oil and configured to control supply of a quantity of oil.

14. A control method of an oil supply system of a hybrid vehicle, the control method comprising:
    supplying, by a first pump of the oil supply system during operation of the hybrid vehicle, a first quantity of oil generated by the first pump to driving motor of the hybrid vehicle via a first main flow channel;

supplying, by a second pump of the oil system, a second quantity of oil generated by the second pump to a friction lubrication element of the hybrid vehicle via a second main flow channel formed independently of the first main flow channel;

selectively supplying, by a flow channel switching valve controlled by a controller of the oil supply system, at least a portion of the second quantity of oil to the driving motor to assist the first quantity of oil via a second bypass flow channel, or at least a portion of the first quantity of oil to the friction lubrication element to assist the second quantity of oil via a first bypass flow channel;

controlling, by the controller, the first pump, the second pump and the flow channel switching valve based on a predetermined operation mode of the hybrid vehicle; and selectively controlling, by the flow channel switching valve, the first bypass flow channel and the second bypass flow channel, which are separately connected to the flow channel switching valve.

15. The control method according to claim 14, wherein when the hybrid vehicle is driven in a stop mode, the first pump is operated, and the second pump is stopped, the flow channel switching valve supplies a portion of the first quantity of oil to the driving motor and other portion of the first quantity of oil to the friction lubrication element.

16. The control method according to claim 14, wherein
when the hybrid vehicle is driven in an electric vehicle (EV) mode and a temperature of the driving motor is within a predetermined normal temperature range, the first pump is stopped, the second pump is operated, and the flow channel switching valve supplies a portion of the second quantity of oil to the friction lubrication element and other portion of the second quantity of oil to the driving motor, and wherein when a temperature of the driving motor exceeds a predetermined temperature range in the EV mode, the first pump and the second pump are operated, and the flow channel switching valve supplies the first quantity of oil to the driving motor, a portion of the second quantity of oil to the friction lubrication element, and other portion of the second quantity of oil to the driving motor to assist the first quantity of oil.

17. The control method according to claim 14, wherein
when the hybrid vehicle is driven in an hybrid electric vehicle (HEV) mode and a vehicle speed is within a predetermined middle speed range, the first pump and the second pump are operated to supply the first quantity of oil to the driving motor and the second quantity of oil to the friction lubrication element, and wherein when a vehicle speed is within a predetermined high speed range in the HEV mode, and the first pump and the second pump are operated, the second quantity of oil is supplied to the friction lubrication element, a portion of the first quantity of oil is supplied to the driving motor, and other portion of the first quantity of oil is supplied to the friction lubrication element by the flow channel switching valve to assist the second quantity of oil.

18. The control method according to claim 14, wherein when the hybrid vehicle is driven in an engine mode, and the first pump and the second pump are operated, the second quantity of oil is supplied to the friction lubrication element, a portion of the first quantity of oil is supplied to the driving motor, and other portion of the first quantity of oil is supplied to the friction lubrication element by the flow channel switching valve to assist the second quantity of oil.

* * * * *